United States Patent [19]
Albach

[11] 4,200,670
[45] Apr. 29, 1980

[54] STACKING GLASS SHEETS
[75] Inventor: Eberhard R. Albach, Toledo, Ohio
[73] Assignee: Libbey-Owens-Ford Company, Toledo, Ohio
[21] Appl. No.: 835,340
[22] Filed: Sep. 21, 1977
[51] Int. Cl.² .............. B65B 33/00; B65D 85/48
[52] U.S. Cl. ............................. 427/154; 65/169; 206/454; 427/202; 427/203; 427/206; 427/421; 427/426; 428/426
[58] Field of Search .......... 65/24, 169; 206/454; 252/11; 428/426; 427/203, 206, 202, 154, 421, 426; 156/283

[56] References Cited
U.S. PATENT DOCUMENTS

| 2,528,391 | 10/1950 | Seddon | 156/635 |
| 2,973,089 | 2/1961 | Brichard et al. | 427/27 X |
| 3,349,900 | 10/1967 | Jones et al. | 206/454 X |
| 3,451,542 | 6/1969 | Bundy et al. | 206/454 X |
| 3,653,501 | 4/1972 | Sauer | 206/454 |
| 3,723,312 | 3/1973 | Hay | 65/24 X |
| 4,011,359 | 3/1977 | Simpkin | 428/441 X |

FOREIGN PATENT DOCUMENTS

| 470044 | 12/1950 | Canada | 206/62 R |
| 2240870 | 3/1975 | France | 206/454 |
| 986475 | 3/1965 | United Kingdom | 427/180 |
| 1159997 | 7/1969 | United Kingdom | 427/195 |

Primary Examiner—Shrive P. Beck
Attorney, Agent, or Firm—Collins, Oberlin & Darr

[57] ABSTRACT

This application describes a method of treating glass sheets to be stacked, by applying water, a stain inhibiting material such as ammonium chloride, and dry particles of a mechanical separator such as wood flour, to such sheets in a plurality of sequential steps; together with articles resulting from that method.

4 Claims, 4 Drawing Figures

STACKING GLASS SHEETS

FIELD OF THE INVENTION

The present invention relates generally to the protecting of glass sheets during packing, shipping and storing. More particularly it has to do with protecting the surfaces of such sheets from physical and chemical change while they are in stacks or packages.

DESCRIPTION OF THE PRIOR ART

One of the greatest problems encountered in the shipping and storing of glass sheets, while they are packed or stacked in face to face relation, is that of retaining the original color, clarity, transparency and surface quality of the glass in the package or stack.

To this end it has been common practice for many years to use interleaving sheets of paper as separators between stacked glass sheets. More recently, alternative types of mechanical separator means, including various particulates have been suggested; and the application of various kinds of acids and acidic substances to the glass, as a means of reducing or preventing staining and other chemically induced injury to or discoloration, has been proposed.

More specifically, it is known to apply stain inhibiting materials, including ammonium salts, alone or in combination with finely divided mechanical separators such as wood flour, to glass surfaces in wet or dry form (see for example British Pat. No. 861,578, and U.S. Pat. Nos. 2,528,391 and 2,973,089). More recently issued U.S. Pat. Nos. 3,723,312 and 4,011,359 disclose wood flour and/or plastic particles, agglomerated or impregnated with a stain inhibiting material such as adipic acid, and applied to the glass in dry powdered form, to serve as interleaving materials between facing sheets.

However, none of the separator or packing means available to date, has provided the kind of surface quality insurance that is required in a day and age that employs commercial sheet glass in such critical environments as sight openings, mirrors, lenses, and the like, for everything from automobiles to scientific instruments.

SUMMARY OF THE INVENTION

The present invention, on the other hand, makes it possible to positively and adequately protect glass sheets during packing, shipping and storing, even under extreme and adverse handling, atmospheric and environmental conditions, for extended periods of time, with minimal risk of physical injury or deterioration in surface quality.

More particularly it does this by a method that involves applying water, a stain inhibiting material, and dry finely divided particles of a mechanical separator to surfaces of glass sheets, prior to stacking, in a plurality of sequential steps that produce an adherent coating on each glass sheet, which coating becomes a protective interleaving between facing surfaces when the sheets are stacked.

According to one specific embodiment, this is accomplished by applying the water and stain inhibitor to the glass as an aqueous solution of the latter, to provide a wet layer on the sheet surface, and then separately applying a dry particulate layer of a mechanical separator to the wet layer.

However the method can also be carried out by first spraying the glass surface with water alone, and then separately applying a layer or layers of a stain inhibitor and a mechanical separator in dry powdered form to the layer of water; or, by first applying a layer of a mixture of dry, powdered stain inhibitor and mechanical separator, and then spraying this layer of dry materials with water.

Accordingly, it is a primary object of this invention to provide a novel, more efficient, and economical way of protecting the surfaces of glass sheets for, during, and after stacking them in face to face relation.

Another object is to provide an improved procedure for applying stain inhibiting and mechanical separating materials to surfaces of glass sheets to be stacked, that will bond these materials to the glass surface, and so retain them thereon during all necessary handling, and in effective interleaving position in the stack for longer periods of time.

Further objects and advantages will become apparent during the course of the following description, when read in connection with the accompanying drawings.

BRIEF DESCRIPTION OF THE DRAWINGS

In the drawings, wherein like numerals refer to like parts throughout.

BACKGROUND

Figure 1:
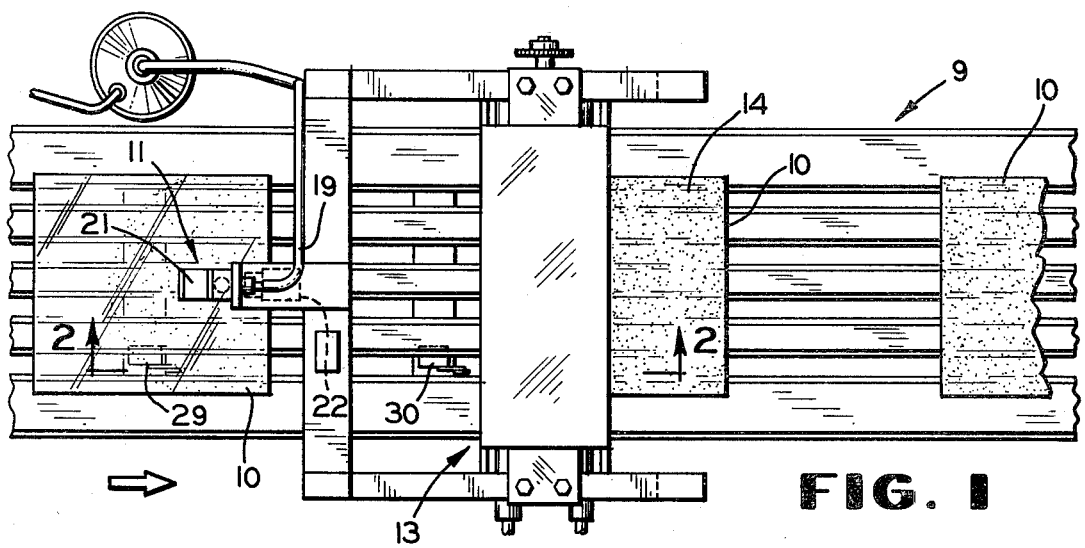
FIG. 1 is a plan view of a part of a packing line along which glass sheets are passed and treated preparatory to packing or stacking them for shipment or storage.

Although not always the case, packing or storing of glass sheets ordinarily takes place very shortly after the glass has been produced and cut into sheets, and at or near the end of a conveyor, such as indicated at 9 in FIG. 1, upon which sheets 10 are being moved into a packing or storage area.

It is common practice, at this point, to apply to at least one surface of each of the series of glass sheets moving along the conveyor, and that are to be stacked into shipping boxes or containers, or onto transporting equipment, whatever is to be used as the protective coating, and is to become the interleaving material between the stacked sheets. As explained above, paper was formerly quite widely used for the purpose; and both wet and dry sprays of stain inhibitors alone have been suggested; but, more recently, combinations of wood flour and/or plastics with stain inhibitors, applied to the glass as a mixture, and in dry powdered form, have come into greatest favor.

However, one of the novel features of the present invention, is that water, as well as a stain inhibitor and a mechanical separator, is applied to the glass in the particular sequence of steps that are involved in building up applicant's protective interlayer; and the success of this purposeful introduction of water is surprising because, as explained in lines 18 to 25 on page 1 of British Pat. No. 861,578, and subscribed to in lines 48 to 52 in column 1 of U.S. Pat. No. 3,723,312 and in lines 25 to 27 in column 1 of U.S. Pat. No. 4,011,359, the presence of water has always heretofore been considered a primary cause of "staining" and "iridescence" in stacked glass.

Nevertheless, as will become apparent hereinafter, applicant's use of water in applying his protective coating is an important part of his concept and one that is responsible for many of the improved results obtained.

DESCRIPTION OF PREFERRED EMBODIMENTS

According to one embodiment of the invention, glass sheets 10, moving from left to right along the conveyor 9 and into stacking position, pass first beneath an atomizing device 11 and through a fog of a stain inhibitor solution 12 projected therefrom. The sheet 10, wet with and carrying the thus applied layer of stain inhibitor solution, then passes under an electrostatic spraying applicator 13 which separately applies a uniform layer of a dry particulate mechanical separator material 14 to the wet sheet.

Figure 3:
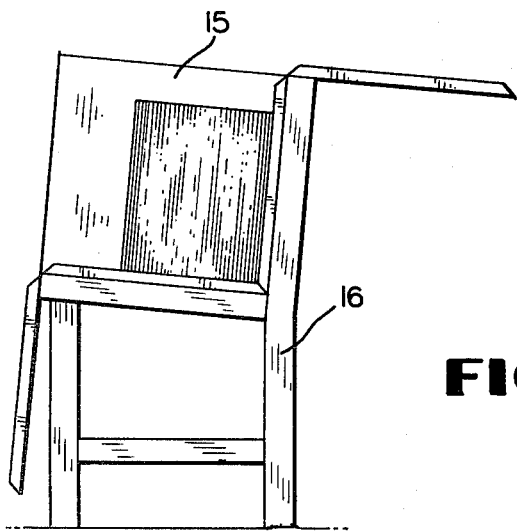
FIG. 3 is a fragmentary end elevation of a packing bench showing a shipping box in the process of having glass sheets stacked therein; and, FIG. 4 is an end view of a railway flat car with a rack or buck load of large glass sheets stacked and held in position thereon.
Figure 4:
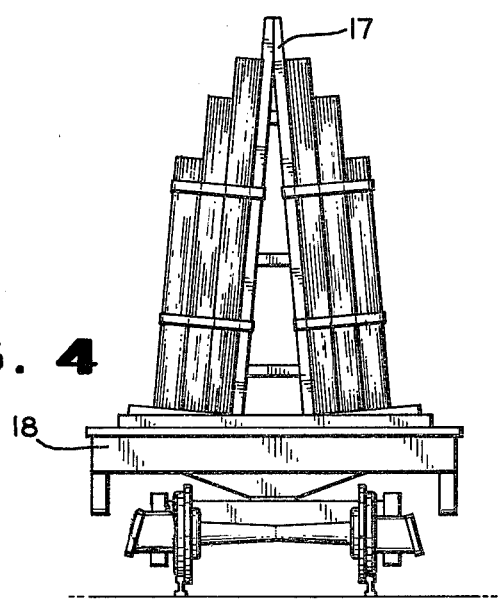

The layer of the solution of stain inhibitor, as it dries, acts to bond itself and the particles in the layer of mechanical separator material to the glass surface and, by the time the sheet reaches the end of the conveyor 9, is dry enough to permit the glass to be stacked into a packing box 15, as shown on a bench 16 in FIG. 3; or on a buck 17, as shown on a railroad flat car 18 in FIG. 4. Indeed, tests have shown that glass protected as just described can be stacked while still wet without seriously affecting the protective capacity of the so applied coating interlayer.

Also, although the materials of the resulting interlaying coating are sufficiently tightly adhered, bonded or fused to the glass to retain it on the sheet during any ordinary handling incident to stacking or packing, and to retain it in interleaving position during any ordinary movement incident to shipping or storing, it can be readily removed by water washing.

In actual practice the stain inhibiting material employed is preferably one of a select group of ammonium compounds, water solutions of which will not form insoluble compounds when they come in contact with carbon or sulphur dioxide (the gases normally present in the atmosphere), or when they come in contact with sulphur trioxide or hydrogen sulphide (gases that are sometimes present in the atmosphere); and which ammonium compounds include, along with ammonium chloride, ammonium citrate, ammonium nitrate, ammonium sulphate, and dihydrogen ammonium phosphate.

Figure 2:
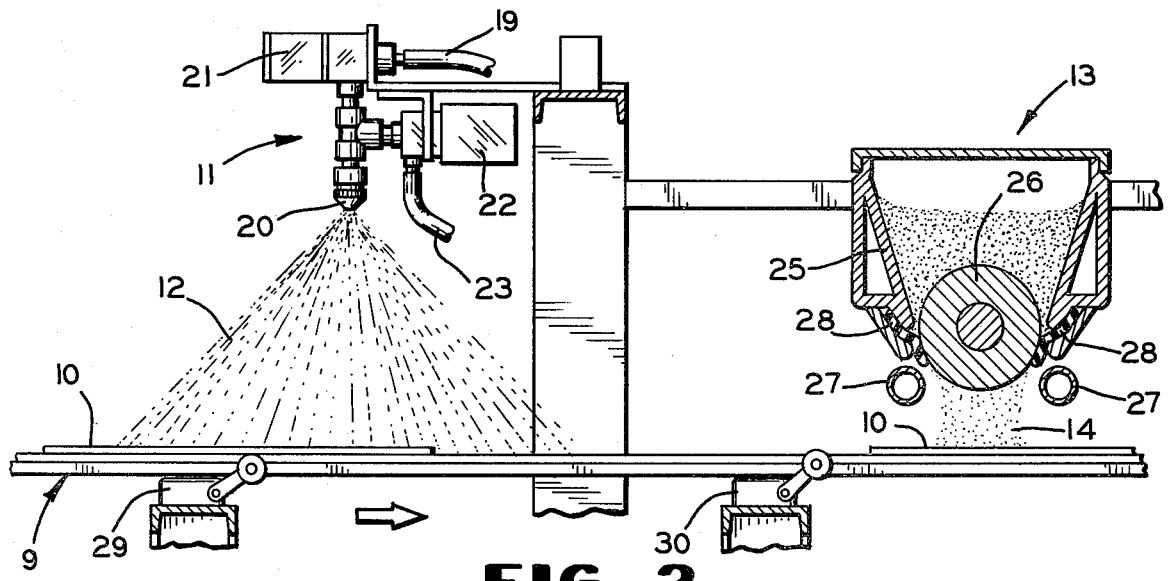
FIG. 2 is a vertical, sectional view taken substantially along the line 2—2 in FIG. 1, and illustrating the operation of a device for atomizing water or a solution of stain inhibiting material, and of an applicator for dry, finely divided particulate materials.

Hydraulic atomization is preferably employed to produce the spray 12. Its operation is simple, requiring only, as indicated in FIGS. 1 and 2, a hook-up consisting of a single feed line 19 supplying a nozzle 20. The nozzle 20 illustrated is a Spraying Systems product listed as ¼ NN 1.5–0.020 orifice-core No. 216, and sprays 1.01 gallons of a 6% NH$_4$Cl solution per hour at 30 p.s.i. and 1.46 gallone per hour at 70 p.s.i., which is the upper operating pressure limited by the diaphragm type, corrosion resistant Teflon, electric solenoid 21 used to control the feed to the nozzle 20; and, to insure accurate cut off, a similar solenoid 22 can be provided in a drainage line 23 from the nozzle.

The preferred mechanical separator material is a hard wood flour, such as maple or oak, and the sizes of the particles should be such as to avoid clogging, insure efficient operation of the applicating equipment, and reduce atmospheric dusting and equipment contamination.

Generally speaking, good results from all of these standpoints will be obtained when at least 75% of the particle sizes are from 50 and 270 mesh; and to insure adequate protection in stacking the glass and thereafter, it is necessary that the mechanical separator material be applied with a high degree of particle dispersion. For best results, it is desirable to provide a uniform coating having a density of 20 milligrams per square foot, although coverages as low as 3.4 milligrams per square foot have performed acceptably, and coverages of anywhere between 10 and 30 milligrams per square foot are commercially practicable.

A device suitable for the purpose, and which utilizes gravity to propel charged particles of the mixture to the moving glass sheets 10 passing therebelow, may be a so called Oxy-Dry sprayer such as shown at 13 in FIGS. 1 and 2. With this device, the particles 14 of wood flour are fed from a hopper 25 to an etched metering roller 26, and through ionized air in an electrostatic field, induced by electronic tubes 27, onto the glass 10 below. A very high degree of particle dispersion comes from the like-charged particle repulsion which sets up a whirling cloud of charged particles in the field and, under influence of gravity, particles from the whirling cloud settle to the glass sheets and there form a close, but highly dispersed, particle deposition pattern.

Wiper blades 28, in combination with the vertically adjustable metering roller 26, give precise metering control, and the chamberized side frames of the hopper 25 provide a curtain to confine air borne particles of the mixture. Further, the hopper 25 may be heated to reduce the moisture content of the mixture being fed, whenever necessary or desirable.

The following example describes more specifically an early test procedure that has since been repeatedly employed in commercial operation to successfully practice the invention:

EXAMPLE

Glass sheets 10 to be packed, and at a temperature of around 100° F., were fed along the conveyor 9 at a speed of 1400 inches per minute. As the forward edge of each sheet reached spraying position it depressed the roller of a switch 29 which, while its roller was depressed, actuated the atomizing nozzle 20 to project a fog of a 6% water solution of ammonium chloride 12 onto the glass surface to spray a volume per square foot of:

$$1.01/60 \times 0.0086 \text{ or } 0.00014 \text{ gallon @ 30 psi}$$

and deposit 30 milligrams per square foot of the stain inhibitor.

From the atomizing area the forward ends of the sheets 10, wet with the layer of the solution of ammonium chloride, passed over and depressed the roller of a switch 30 which, while depressed, actuated the Oxy-Dry Sprayer 13 to dust a 10 to 15 milligram per square foot coating or layer of 70 mesh hard wood flour onto the wet glass surface.

In lieu of hydraulic atomization, air or sonic atomization may be employed in the above described procedure, or whenever the water is applied first, either alone or in an aqueous solution of the stain inhibitor. However, where the dry mechanical separator layer is applied first, and the water either alone or in an aqueous solution is applied afterwards, these alternate forms of atomization are unsatisfactory because the high volumes of air required blow away large amounts of the pre applied mechanical separator.

In any event, it is to be understood that the forms of the invention herein illustrated and described are to be taken as preferred embodiments only of the same and that various changes in the procedures, compositions, or in the size, shape and arrangement of parts, may be resorted to without departing from the spirit of the invention as defined in the following claims.

I claim:

1. A method of treating a glass sheet for stacking in face-to-face relation with other glass sheets, consisting essentially of applying atomized water, a stain inhibitor, and dry particles of a mechanical separator to a surface of said sheet in a plurality of sequential steps that fuse said stain inhibitor and said mechanical separator to said surface through a water bond.

2. A method as claimed in claim 1, in which said water and said stain inhibitor are applied as an atomized aqueous solution of said stain inhibitor to wet said surface, and said dry particles of said mechanical separator are dusted onto said wet surface.

3. A method as claimed in claim 1, in which said stain inhibitor and said mechanical separator are applied in dry form, and said water is applied thereto to wet and bond the same to said surface.

4. A method as claimed in claim 1, in which said water is applied by wetting said surface by contact with a fog produced by hydraulic atomization of said water, and said stain inhibitor and said mechanical separator are applied in dry form to said wet surface.

* * * * *